US011170179B2

(12) United States Patent
Mills et al.

(10) Patent No.: US 11,170,179 B2
(45) Date of Patent: Nov. 9, 2021

(54) SYSTEMS AND METHODS FOR NATURAL LANGUAGE PROCESSING OF STRUCTURED DOCUMENTS

(71) Applicant: JPMorgan Chase Bank, N.A., New York, NY (US)

(72) Inventors: Jason D. Mills, Montclair, NJ (US); Zheng Wu, New York, NY (US); Jennifer Rabowsky, New York, NY (US); Kenny Song, Weehawken, NJ (US); Khaled Bugrara, Framingham, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 158 days.

(21) Appl. No.: 16/021,112

(22) Filed: Jun. 28, 2018

(65) Prior Publication Data

US 2019/0005029 A1   Jan. 3, 2019

Related U.S. Application Data

(60) Provisional application No. 62/527,487, filed on Jun. 30, 2017.

(51) Int. Cl.
*G06F 40/40*   (2020.01)
*G06K 9/00*   (2006.01)
*G06F 40/30*   (2020.01)
*G06F 40/205*   (2020.01)
*G06F 40/106*   (2020.01)

(52) U.S. Cl.
CPC ............ *G06F 40/40* (2020.01); *G06F 40/205* (2020.01); *G06F 40/30* (2020.01); *G06K 9/00469* (2013.01); *G06F 40/106* (2020.01)

(58) Field of Classification Search
USPC ....................................... 704/7–10
See application file for complete search history.

(56) References Cited

U.S. PATENT DOCUMENTS

| 2014/0164407 A1* | 6/2014 | Dubbels ................ G06F 40/205 707/755 |
| 2014/0164408 A1* | 6/2014 | Dubbels ................ G06F 40/205 707/755 |
| 2016/0275073 A1* | 9/2016 | Poon ...................... G06F 40/211 |
| 2018/0039695 A1* | 2/2018 | Chalabi .................. G06N 5/022 |
| 2018/0232563 A1* | 8/2018 | Albadawi .......... G06K 9/00214 |
| 2019/0286999 A1* | 9/2019 | Chalabi .................. G06N 5/022 |

* cited by examiner

*Primary Examiner* — Leonard Saint Cyr
(74) *Attorney, Agent, or Firm* — Greenberg Traurig LLP

(57) ABSTRACT

Systems and methods for natural language processing of structured documents. In another embodiment, in an information processing apparatus comprising at least one computer processor, a method for processing a structured document may include: (1) receiving a document; (2) parsing the document into a plurality of components using a statistical parser; (3) extracting a plurality of entities from each component; (4) identifying a potential relationship between two of the plurality of entities; (5) generating a numeric representation for the potential relationship; (6) confirming the potential relationship with a logical regression model; and (7) generating and storing a unified structured file for the document.

20 Claims, 3 Drawing Sheets

SYSTEMS AND METHODS FOR NATURAL LANGUAGE PROCESSING OF STRUCTURED DOCUMENTS

RELATED APPLICATIONS

The present application claims priority to U.S. Provisional Patent Application Ser. No. 62/527,487, filed Jun. 30, 2017, the disclosure of which is hereby incorporated by reference in its entirety.

BACKGROUND OF THE INVENTION

1. Field of the Invention

The present invention generally relates to systems and methods for natural language processing of structured documents.

2. Description of the Related Art

Contracts and other documents are often reviewed and only a limited number of data is extracted manually by analysts. There is no quick and easy way to identify clauses and terms in historic contracts (and other lending document) to be leveraged for actionable analytics.

SUMMARY OF THE INVENTION

Systems and methods for natural language processing of structured documents are disclosed. According to one embodiment, a method for natural language processing of a structured document comprising a contract between a plurality of parties may include: (1) a server comprising at least one computer processor receiving a raw structured document; (2) the server parsing the document into a plurality of components; (3) the server generating an ontology defining a contractual relationship between the parties to the contract; (4) the server extracting a plurality of entities from each component using an entity recognition engine; (5) the server identifying at least one relationship between a plurality of the entities using a relation extraction engine; (6) the server identifying a plurality of defined terms in the document; (7) the server generating a vector representation for each component and sub-component using a contract language engine; (8) the server generating a unified structured file; and (9) the server updating at least one of the contract language engine, the entity recognition engine, and the relation extraction engine.

In another embodiment, in an information processing apparatus comprising at least one computer processor, a method for processing a structured document may include: (1) receiving a document; (2) parsing the document into a plurality of components using a statistical parser; (3) extracting a plurality of entities from each component; (4) identifying a potential relationship between two of the plurality of entities; (5) generating a numeric representation for the potential relationship; (6) confirming the potential relationship with a logical regression model; and (7) generating and storing a unified structured file for the document.

In one embodiment, the statistical parser may include a neural network.

In one embodiment, the plurality of components may include at least one of a participating party, an article, a section, a subsection, and a subsubsection.

In one embodiment, the statistical parser may parse the document based on a first vector of word embeddings and a second vector of orthographic properties of words in the document.

In one embodiment, the step of parsing the document into a plurality of components may include identifying a relationship among the plurality of components.

In one embodiment, the method may further include filtering the document into a plurality of sections using a statistical section filter.

In one embodiment, the method may further include generating a score for each sentence or paragraph of the document In one embodiment, the score may be generated using a latent semantic indexing model, a continuous bag-of-words model, etc.

In one embodiment, the plurality of entities may be extracted using a Conditional Random Field model.

In one embodiment, the potential relationship may be based on an ontology.

In one embodiment, the potential relationship may be based on a hierarchical correspondence rule.

In one embodiment, the numeric representation for the potential relationship may be based on functional features, tail features, and head features of the potential relationship.

In one embodiment, the method may further include identifying a plurality of defined terms in the document.

In one embodiment, the logical regression model may confirm each potential relationship as being true or false.

In one embodiment, the method may further include generating a graphical representation of the document.

In one embodiment, the document may include a structured document.

In one embodiment, the method may further include receiving feedback on an accuracy of at least one of the plurality of components identified using the statistical parser; and updating the statistical parser based on the feedback.

In one embodiment, the method may further include receiving feedback on an accuracy of at least one of the entities extracted using the Conditional Random Field model; and updating the Conditional Random Field model based on the feedback.

In one embodiment, the method may further include receiving feedback on an accuracy of at least one of the potential relationships confirmed using the logical regression model; and updating the logical regression model based on the feedback.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
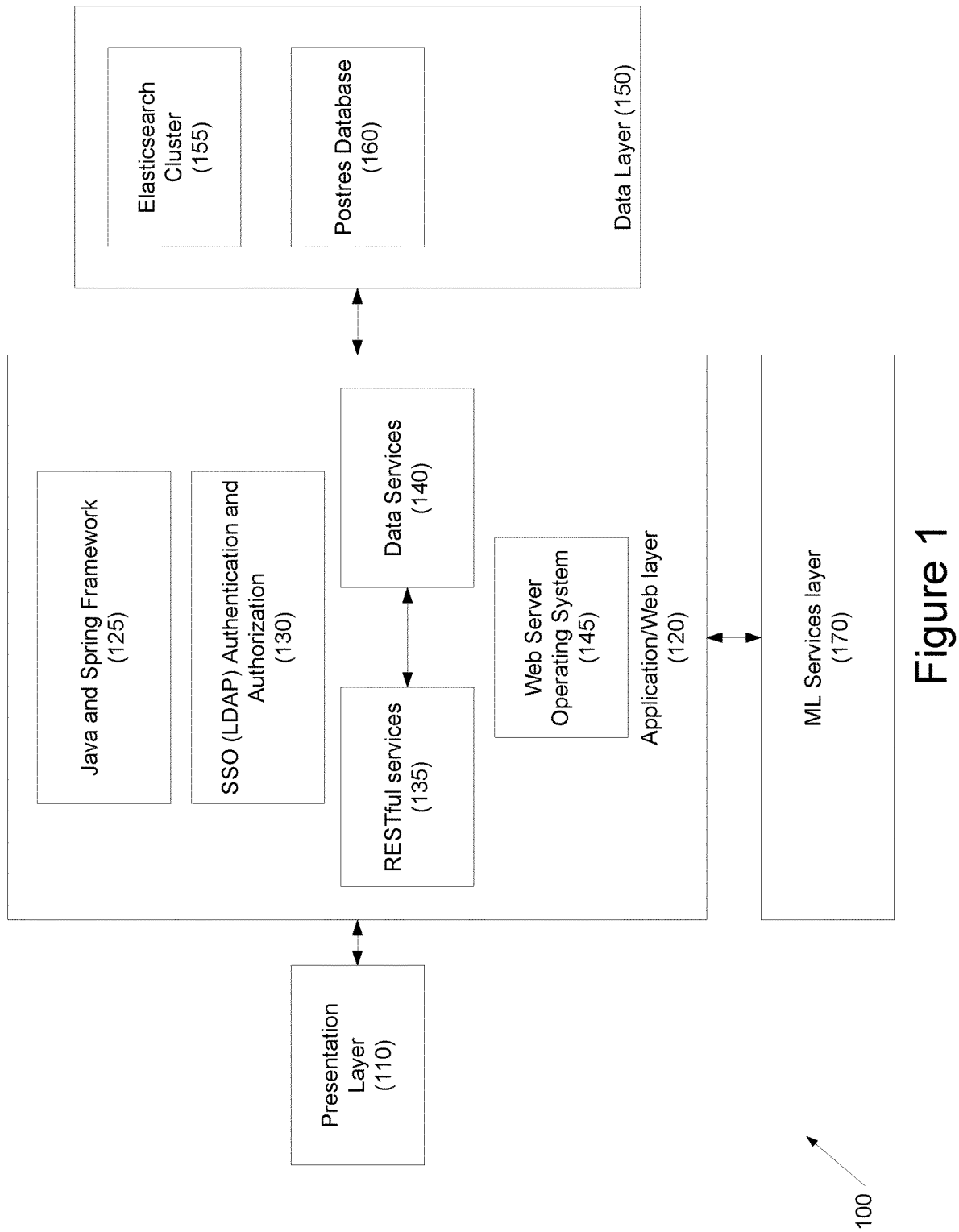
FIG. 1 depicts a functional diagram for a system for natural language processing of structured documents according to one embodiment.

Embodiments disclosed herein are directed to systems and methods for natural language processing of structured documents. In one embodiment, the structured documents may be related to financial services, and may include contracts or other legal documents.

In one embodiment, machine learning and Natural Language Processing (NLP) techniques may be used to extract and analyze salient, unstructured information contained in documents, such as contracts and other legal documents. This information may be used, for example, to enhance inputs into credit capital models and regulatory reporting, as well as for other purposes.

In one embodiment, value extraction may be automated, and manual keying may be replaced with machine-readable, structured output. Embodiments may reduce the processing time spent on reading and analyzing contracts, and may provide the ability to search for concepts across a large population of contracts and validate key clauses within a contract.

Although this disclosure is made in the context of structured documents, such contracts and other legal documents, it should be recognized that embodiments have applicability to other types of structured documents.

Exemplary embodiments may include some or all of the following. For example, embodiments may include a base platform, which may be a knowledgebase of indexed contracts with cross document search capabilities; contract modeling, which may construct a contract object model to enable contextual search and visualization; advanced intelligent search and entity extraction, which may enable advanced search capabilities across all contracts processed in the platform; supervised learning capabilities, which may integrate feedback from persons with knowledge into the NLP models to improve model performance; contract analysis and validation, which may provide the ability to analyze and validate terms and clauses within a contract; reporting, which may provide a dashboard and the ability to review system metrics and model performance; machine learning based contract drafting, which may enhance the contract drafting process by leveraging the language in the contract knowledgebase; and may facilitate the research and development of additional capabilities and uses cases, such as Smart Contracts.

In addition, embodiments may provide keyword searching across some or all of a document repository. For example, keyword searching may be performed using a name, a borrower, a date, etc. In one embodiment, a synonym search function may be provided that, when looked up for a defined term, groups and extracts other defined terms with similar meanings ranked by term similarity across some or all of the entire document repository.

Embodiments may provide a semantic search function that may enable the search of context with similar meaning to a query text within a document, or across some or all of the entire document repository.

Embodiments may provide supervised learning capabilities that incorporate feedback into the NLP model training to further improve model performance and generate evidence of the improvements.

Embodiments may identify and extract various types of entities of interest from the documents, such as Named Date (e.g., Expiry Date, Last Draw Date), Named Amount (e.g., Commitment Amount), Date (e.g., Sep. 1, 2011), Amount (e.g., $5,000,000), etc. Embodiments may facilitate the automated extraction of both direct relations, such as where entities are linked as a set of key-value pairs (Expiry Date means Sep. 1, 2011) and indirect relations, such as where entities are connected by a calculation formula (e.g., Expiration date is five Business Days prior to the Commitment Termination Date). For direct relations, a value may be assigned to the corresponding key entity, and for indirect relations, the formula may be extracted and stored as a rule/calculation formula.

For complex pricing logic, including those with conditional statements, (e.g., Eurocurrency Spread set forth above shall increase for each of Level 1 and Level 2 by an additional 0.25% on the date that is 90 days after the Closing Date and every 90 days thereafter), key entities may be extracted and the formula built.

Embodiments may identify and relate a corresponding facility to extracted entities and relations by traversing the connections in a knowledge graph. Covenants may be modeled as a graph component and may provide functionalities that enable the classification and profiling of covenant clauses across documents so that a user can validate the existence of certain clauses within a document and search for those clauses.

FIG. 1 depicts a system natural language processing of structured documents according to one embodiment. In one embodiment, system 100 may include presentation layer 110, application/web layer 120, and data layer 150. Presentation layer 110, application/web layer 120, and/or data layer 150 may execute on one or more servers comprising one or more computer processors.

In one embodiment, presentation layer 110 may provide an interface with a user. In one embodiment, presentation layer 110 may execute on an electronic device (e.g., a smartphone, tablet computer, desktop computer, workstation, etc.) and may provide a web-based interface (e.g., browser-based) for the user.

In one embodiment, presentation layer 110 may be built using HTML CSS and JavaScript/TypeScript. The distribution from presentation layer 110 may be run in a browser.

In one embodiment, presentation layer 110 may require SSO login with required roles.

In one embodiment application/web layer 120 may include, for example, Java and Spring framework 125, SSO (LDAP) authentication and authorization 130, Web/REST services 135, data services 140, and web server operating system 145.

In one embodiment, application/web layer 120 may be built on a Java platform using Spring framework. The distribution from application/web layer 120 may be run on the Tomcat web server.

In one embodiment, application/web layer 120 may use SSO (LDAP) mechanism 130 to support authentication and authorization. Web services may be load balanced using, for example, Apache HTTPD.

Application/web layer 120 may include RESTful services 135 that may process API requests and responses, and data services 140, which may provide communications between RESTful services 135 and data layer 150 and machine learning (ML) services layer 170.

In one embodiment, RESTful services 135 may interface with presentation layer 110 and receive requests and output results to, for example, a browser.

In one embodiment, data layer 150 may include Elasticsearch cluster 155 and Postgres database 160. Elasticsearch cluster 155 may be used as a document indexing and search platform, and may be secured with, for example, Elasticsearch security. Postgres database 160 may store the application configuration/metadata, user settings, user activity logs, etc. This may be secured with, for example, Postgres user security.

Machine learning (ML) services layer 170 may be built, for example, on the Phyton platform. The distribution from ML services layer 170 may be run on, for example, a Flask server.

ML services layer 170 may implement, for example, a POST-type RESTful method to accept a structured document as input, and may return extractions as an output.

ML services layer 170 may be secured, for example, with IP white-listing.

Figure 2:
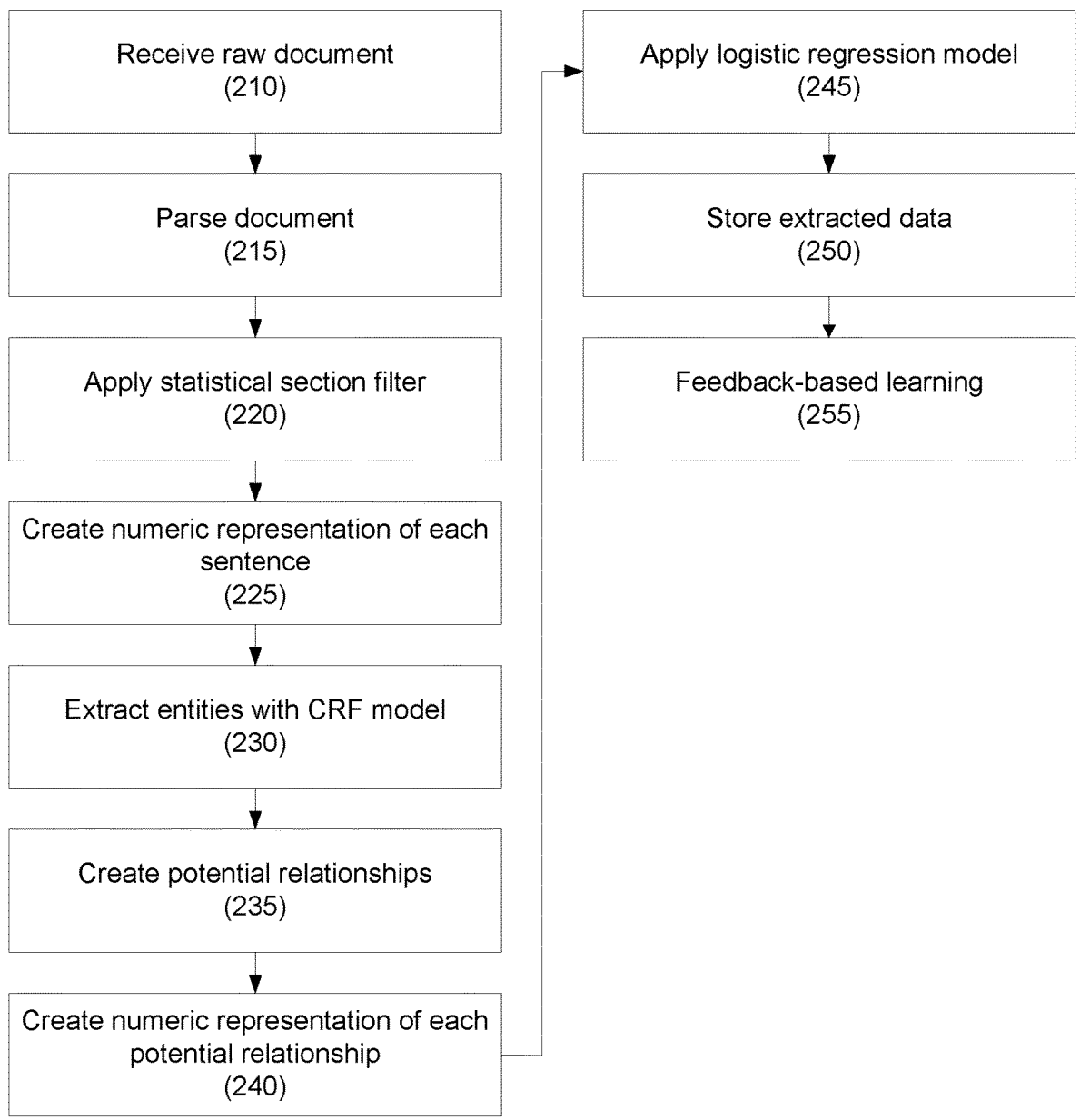
FIG. 2 depicts a method for natural language processing of structured documents according to one embodiment.

Referring to FIG. 2, a method for natural language processing of a document is disclosed according to one embodiment. In step 210, a document, such as a contract, may be received in raw form, in Portable Document Format (PDF), etc. In one embodiment, any document processing (e.g., optical character recognition, text recognition, enhancement, etc.) may be performed as is necessary and/or desired.

In one embodiment, the document may be a credit agreement. It should be recognized that the disclosure is not limited to credit agreements only, but any structured, or semi-structured, document may be evaluated.

In step 215, a statistical parser may identify a plurality of components within a document. For example, the statistical parser may include a neural network that identifies components such as participating parties, articles, sections, subsections, subsubsections, etc. In one embodiment, logical relationships among the components of the document may be identified. Such logical relationships may include the cross-referencing of components, and the similarity of those components discovered. These relationships may then be stored in an index for intra-document searching, and may be fed to the ontology derived below.

In one embodiment, input data for the statistical parser may include a combination of two component vectors covering, for example, the first twenty words of each paragraph. Other number of words may be used as is necessary and/or desired. The first vector may be a vector of word embeddings that may be produced by, for example, the open-source rule-based parser Spacy. The second vector may encode orthographic properties (shape) of each of the words analyzed. Together, these vectors may be transformed into a numerical representation of the sequence of words, where each word may be represented by a single numerical key.

In step 220, a statistical section filter may be applied. In one embodiment, the statistical section filter may filter paragraphs from certain sections, subsections, subsubsections, etc. of the document. For example, the statistical section filter may filter paragraphs from one or more of the coverpage, preamble, defined term section(s), credit section(s), etc.

In one embodiment, the relationships between entities may be sourced from a subset of the document to reduce false positives. In one embodiment, human interaction may be used to verify the relationships.

In step 225, numeric representations of each sentence, each paragraph, etc. may be generated. In one embodiment, a latent semantic indexing (LSI) model may be used to assist with searching the document. For example, the cosine similarities between these scores and scores for individual words allows the user to type in a search query, e.g., 'Maturity Date', and find the most relevant sentences, paragraphs, sections of the document to that query.

In one embodiment, the numeric representation may be based on the text of the sentence or paragraph.

In one embodiment, the score may be generated by a latent semantic indexing (LSI) model, a continuous bag-of-words (CBOW) model, etc.

In step 230, entities may be extracted using, for example, a Conditional Random Field (CRF) model. Entities may include parties, facilities, equipment, dollar amounts, dates (e.g., agreement date, maturity date, etc.), etc.

Input data for the CRF model may include an abstract representation of each word within a sentence, for all sentences in a paragraph, for all paragraphs in scope. The way this abstract representation is created is via unigram and bigram features, which provides information about each word in isolation, and each word in the context of the sentence.

For example, a credit agreement may include two facilities, each with a different commitment amount. The CRF model may extract each facility name and each commitment amount from the credit agreement.

In step 235, the context (i.e., text from which the entity has been extracted and the location of the entity within that text) and the entities may be passed to a potential relationship extractor to identify potential relationships. Based on the entities identified in a paragraph, the potential relationship extractor may establish potential relationships among entities. Relationships among entities follow a known ontology, or set of hierarchical correspondence rules, and thus only certain relationships among element 1 of the pair (the head in the current context) and element 2 of the pair (the tail in the current context) may be allowed. For a given paragraph the potential relationship extractor might generate R potential relationships:

$$\text{step\_1} = [\text{context, head\_1, head\_type\_1, tail\_1, tail\_type\_1}]$$

$$\text{step\_2} = [\text{context, head\_2, head\_type\_2, tail\_2, tail\_type\_2}]$$

$$\vdots$$

$$\text{step\_R} = [\text{context, head\_R, head\_type\_R, tail\_R, tail\_type\_R}]$$

where R might vary depending on the richness of labels in the paragraph, the head_type and tail_type are the types of entities the rule-based potential relationship extractor considers likely to occur in the paragraph, and the head and tail are the corresponding pieces of text in the paragraph that have been labeled as head_type and tail_type, respectively.

In step 240, a numeric representation of each potential relationship may be created. In on embodiment, the potential relationships may be featurized based on, for example, function features (e.g., return a "1" if the stated condition is met, otherwise returns "0"), tail features (e.g., return a "1" if the tail is the type of entity mentioned, otherwise returns "0"), and head features (e.g., return a "1" if the head is the type of entity mentioned, otherwise returns "0"). Tables 1, 2, and 3, below, identify illustrative function features, tail features, and head features. It should be understood that other function features, tail features, and head features, as well as any other features, may be used as is necessary and/or desired.

TABLE 1

| | |
|---|---|
| head_not_in_context | head_in_context_before |
| head_in_context_after | head_in_head_group_before |
| head_in_head_group_before | only_head_in_context |
| not_only_head_in_context | head_in_head_group_previous_paragraph |
| no_head_group | punctuation_between_head_and_tail |
| no_punctuation_between_head_and_tail | list_between_head_and_tail |
| no_list_between_head_and_tail | all_language_before_tail |
| context_is_all_definition | or_list_between_head_and_tail |
| no_or_list_between_head_and_tail | sentance_end_between_head_and_tail |
| no_sentance_end_between_head_and_tail | tail_to_pricing_language_between_head_and_tail |
| no_tail_to_pricing_language_between_head_and_tail | closest_head_to_tail |
| no closest head to tall | |

TABLE 2

| | |
|---|---|
| tail_closing_date | tail_commitment_amount |
| tail_maturity_date | tail_agreement_date |
| tai_os_type | tail_termination_date |
| tail_pricing_option | tail_effective_date |
| tail_expiration_date | tail_currency |
| tail_floor | tail_business_day |
| tail_interest_period | tail_pricing_subcomponent |
| tall_rounding | tail_operator |
| tall_percent_operator | tail_applicable_margin |
| tall_basls_of_calculation | tail_commitment_fee |
| tail_expiry_date | tail_facility_name |
| tail_facility_type | tail_fronting_fee |
| tail_other_fees | tail_letter_fees |
| tail fee condition | tail in days advance |
| tail_in_time_of_day | tail_in_time_zone |
| tail_max_draws | |

TABLE 3

| | |
|---|---|
| head_all | head_none |
| head_facility_name | head_os_type |
| head_pricing_option | head_pricing_sub_component |
| head_lc_fee | head_commitment_fee |
| head_fronting fee | head agreement |

Based on the featurization, a binary vector of, for example, 64 elements whose values, f, can be either 1 or 0 as shown below $$step\_1 = [f1\_1, f2\_1, ..., f64\_1]$$

$$step\_2 = [f1\_2, f2\_2, ..., f64\_2]$$

$$\vdots$$

$$step\_R = [f1\_R, f2\_R, ..., f64\_R]$$

Next, for each vector, a set of polynomial features of up to order 3 may be created to capture all possible permutations (up to order 3) of products of elements in the vector. This is equivalent to having AND conditions on combinations of the features discussed above, as only products of 1s will result in 1. In general, for $N_F$ features the number of terms $N_T$ generated by the order 3 polynomial featurization is:

$$N_T(N_F) = 1 + N_F + \sum_{i=1}^{N_F} i + N_F^2 + \frac{(N_F)!}{(N_F - 3)!(3)!}$$

For $N_F$=64, the number of terms in each vector created as part of this step 4 is $N_T$=47,905.

Thus, the outcome of this step can be seen as $$X\_1 = [X1\_1, X2\_1, ..., X47905\_1]$$

$$X\_1 = [X1\_2, X2\_2, ..., X47905\_2]$$

$$\vdots$$

$$X\_R = [X1\_R, X2\_R, ..., X47905\_R]$$

For example, these 47,905-dimensional binary vectors X_i generated above, with i∈{1, 2, . . . , R}, is what the trained logistic regression model takes as input to determine whether the relationship between head_i and tail_i above is either True or False.

In step 245, a logistic regression model may be applied. For example, the logistic regression model may establish the relationships identified in step 235 as true or false.

Figure 3:
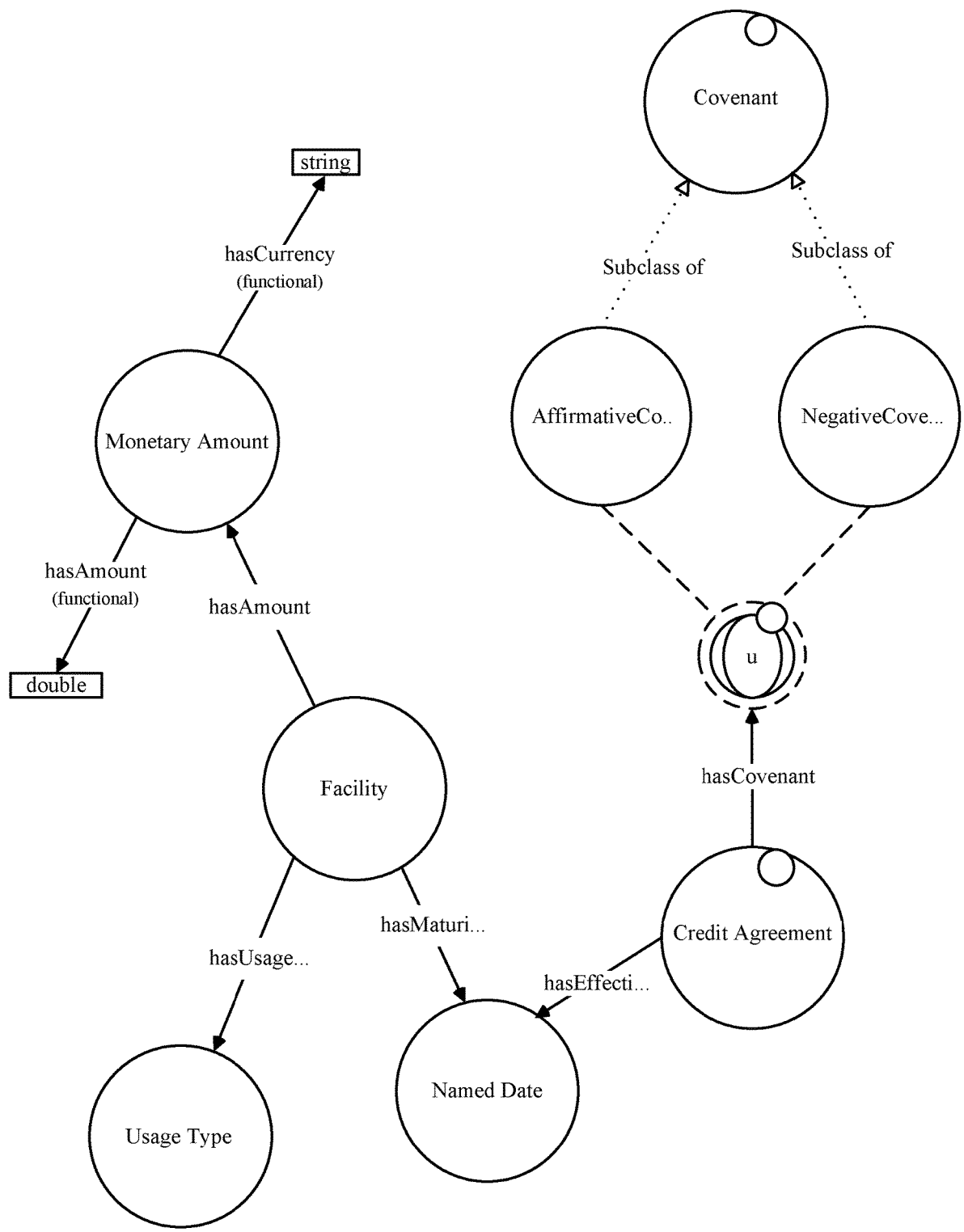
FIG. 3 depicts an illustrative graphical representation of document according to one embodiment.

In step 250, the extracted data may be stored. For example, a unified JSON structured file, a RDF file, etc. may be generated to represent the document in its ontological form. In one embodiment, this file may be stored in, for example, the index server/nodes, the database, etc. for use as machine-readable data. In one embodiment, this file may be used in the front-end of a web application and to generate a graphical representation of the document and/or document components. An example of such a graphical representation is provided in FIG. 3.

In one embodiment, in step 260, machine learning may be used to update the contract language engine, the entity recognition engine, and/or the relation extraction engine. For example, a subject matter expert may use a front-end application displaying the data collected by one or more of these engines, and may provide positive or negative feedback to one or more of these engines to improve accuracy. In one embodiment, the feedback may be used to update algorithms, weightings, etc. used by the engines.

In one embodiment, as terms that may have specific definitions in the document may be identified. For example, if a definition section is provided, the term and definition may be identified. In one embodiment, any cross-references between terms in the document may be identified. These terms may be further defined based on their usage in the components identified above, and may be used as features for the relationship extraction engine and the entity extraction engine. In one embodiment, definitions and cross-references may be stored in the index severs/nodes and may be used for intra- and cross document analysis and search.

In one embodiment, the components of a document may be broken down further into sub-components, such as paragraphs, sentences, phrases, and words based on semantics. In one embodiment, a vector representation of the components and its sub-components may be created by, for example, a contract language engine, and may be stored in a semantic vector database for future analysis. This contract language engine may use, for example, a word space model of contract language that has learned, from a large corpus of documents, the meaning and relationship of individual words, n-grams, etc. In one embodiment, this semantic vector database may be used, for example, for synonym analysis, semantic searching, and component and sub-component clustering.

In one embodiment, the data extracted and identified may be used to model the document as a graph. In one embodiment, the graph may identify as nodes, entities or concepts (e.g., covenant, facility, fee, ratio, date, etc.) In one embodiment, the nodes may also include attributes (e.g., key-value-pairs).

In one embodiment, the edges may identify direct relationships between two node-entities. In one embodiment, relationships may have quantitative properties, such as weights or strengths.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing a structured document, comprising:
   in an information processing apparatus comprising at least one computer processor:
   receiving a structured legal document;
   parsing the structured legal document into a plurality of document sections using a statistical parser comprising a neural network;
   extracting a plurality of entities from each document section;
   identifying a potential relationship between two of the plurality of entities;
   generating a numeric representation for the potential relationship;
   confirming the potential relationship with a logical regression model;
   generating and storing a unified structured file for the structured legal document;

receiving feedback on an accuracy of at least one of the plurality of document sections identified using the statistical parser; and updating the statistical parser based on the feedback.

2. The method of claim 1, wherein the plurality of document sections comprise an article, a section, a subsection, or a subsubsection.

3. The method of claim 1, wherein the statistical parser parses the structured legal document based on a first vector of word embeddings and a second vector of orthographic properties of words in the legal document.

4. The method of claim 1, wherein the step of parsing the structured legal document into a plurality of document sections comprises identifying a relationship among the plurality of document sections.

5. The method of claim 1, further comprising:
generating a score for each sentence or paragraph of the structured legal document.

6. The method of claim 5, wherein the score is generated using a latent semantic indexing model.

7. The method of claim 5, wherein the score is generated using a continuous bag-of-words model.

8. The method of claim 1, wherein the potential relationship is based on an ontology.

9. The method of claim 1, wherein the potential relationship is based on a hierarchical correspondence rule.

10. The method of claim 1, wherein the numeric representation for the potential relationship is based on functional features, tail features, and head features of the potential relationship.

11. The method of claim 1, further comprising:
identifying a plurality of defined terms in the structured legal document.

12. The method of claim 1, wherein the logical regression model confirms each potential relationship as being true or false.

13. The method of claim 1, further comprising:
generating a graphical representation of the structured legal document.

14. A method for processing a structured document, comprising:
in an information processing apparatus comprising at least one computer processor:
receiving a structured legal document;
parsing the structured legal document into a plurality of document sections using a statistical parser comprising a neural network;
extracting a plurality of entities from each document section using a Conditional Random Field model;
identifying a potential relationship between two of the plurality of entities;
generating a numeric representation for the potential relationship;
confirming the potential relationship with a logical regression model;
generating and storing a unified structured file for the structured legal document;
receiving feedback on an accuracy of at least one of the entities extracted using the Conditional Random Field model; and
updating the Conditional Random Field model based on the feedback.

15. The method of claim 14, wherein the plurality of document sections comprise an article, a section, a subsection, or a subsubsection.

16. The method of claim 14, wherein the statistical parser parses the structured legal document based on a first vector of word embeddings and a second vector of orthographic properties of words in the legal document.

17. A method for processing a structured document, comprising:
in an information processing apparatus comprising at least one computer processor:
receiving a structured legal document;
parsing the structured legal document into a plurality of document sections using a statistical parser comprising a neural network;
extracting a plurality of entities from each document;
identifying a potential relationship between two of the plurality of entities;
generating a numeric representation for the potential relationship;
confirming the potential relationship with a logical regression model;
generating and storing a unified structured file for the structured legal document;
receiving feedback on an accuracy of at least one of the potential relationships confirmed using the logical regression model; and
updating the logical regression model based on the feedback.

18. The method of claim 17, wherein the plurality of document sections comprise an article, a section, a subsection, or a subsubsection.

19. The method of claim 17, wherein the statistical parser parses the structured legal document based on a first vector of word embeddings and a second vector of orthographic properties of words in the legal document.

20. The method of claim 17, wherein further comprising generating a score for each sentence or paragraph of the structured legal document, wherein the score is generated using a latent semantic indexing model or a continuous bag-of-words model.

* * * * *